United States Patent [19]

Yamaguchi et al.

[11] Patent Number: 4,910,081

[45] Date of Patent: Mar. 20, 1990

[54] THERMAL TRANSFER RECORDING INK AND FILM

[75] Inventors: Shinichiro Yamaguchi; Shiro Kawahito; Hiroshi Yashima; Ryuma Mizushima, all of Tochigi, Japan

[73] Assignee: Kao Corporation, Tokyo, Japan

[21] Appl. No.: 244,402

[22] Filed: Sep. 14, 1988

[30] Foreign Application Priority Data

Sep. 18, 1987 [JP] Japan ................................ 62-234398

[51] Int. Cl.[4] ........................ B32B 27/08; B32B 27/36; C09D 3/66; C09D 11/10

[52] U.S. Cl. .................................... 428/327; 428/337; 523/161; 524/277; 524/502; 524/508; 524/509; 524/513; 524/514; 524/537; 524/538; 524/539; 524/540; 525/176; 525/177; 525/190; 525/444

[58] Field of Search ............... 524/277, 502, 508, 509, 524/622, 513, 514, 538, 539, 540, 541; 523/161; 428/220, 283, 327, 337; 525/185, 190, 240, 178

[56] References Cited

U.S. PATENT DOCUMENTS

| | | | |
|---|---|---|---|
| 4,388,427 | 6/1983 | Nishikawa et al. | 523/161 |
| 4,636,258 | 1/1987 | Hayashi et al. | 521/161 |

*Primary Examiner*—Allan M. Lieberman

*Attorney, Agent, or Firm*—Birch, Stewart, Kolasch & Birch

[57] ABSTRACT

A thermal transfer recording ink composition comprises a resin having a melting point according to JIS-K0064 of 55° to 110° C. and a solidification point according to JIS-K0064 being at least 5° C. lower than the melting point, resin particles having a size of 0.05 to 2.0 microns and a coloring matter. It is coated on film and used repeatedly.

10 Claims, 1 Drawing Sheet

THERMAL TRANSFER RECORDING INK AND FILM

BACKGROUND OF THE INVENTION

1. Field of the Invention

The present invention is related to thermal transfer recording ink and ink film, and is more specifically aiming at providing a thermal transfer ink ribbon capable of being used repeatedly to reduce the printing cost in a thermal transfer recording system, which is presently widely employed in personal word processors and the like.

2. Discussion of Related Art

Thermal transfer printers are widely utilized as printers of a popular type by virtue of their small sizes, light weights, and low prices. Particularly by virtue of their maintenance-free feature, these printers have a share of substantially 100% in the field of personal word processers and the like.

Thus, the thermal transfer printing system is endowed with a number of advantages for use in printers of a popular type. It is, however, anticipated that a high printing cost per sheet of paper will become the biggest hindrance to the further expansion of thermal transfer printers from this point on because the above-mentioned system necessitates expensive consumables. This high cost stems from various causes including inevitable production of a wide variety of cassettes in small quantities which results from the necessity of supplying various types of cassettes respectively adapted to various types of printers. The resulting relatively high price of cassettes when compared with that of ribbons. This price disparity is augmented by the difficulty encountered in automating a series of post-fabrication steps such as slitting, core winding, and cassette packing which resulting in high personel expense, as well as a high distribution cost.

SUMMARY OF THE INVENTION

In view of the above-mentioned problems, the present invnetors have undertaken intensive investigations with a view to providing consumables for a thermal transfer printer to realize a low printing cost by using the same ink ribbon repeatedly, and have completed the present invention.

Specifically, the present invention provides a thermal transfer ink capable of effecting repeated printing and comprising as the indispensable components a resin having a melting point (according to JIS-K0064) of 55° to 110° C. and a solidification point according to JIS-K0064 being at least 5° C. lower than the melting point thereof and a coloring agent, characterized in that at least part of the above-mentioned resin is in the form of particles having a size of 2.0 to 0.05μ, and a thermal transfer ink film capable of effecting repeated printing, characterized by comprising a support and an ink of the type mentioned above applied on one surface thereof.

The present invention concerns a thermal transfer recording ink composition which comprises a resin having a melting point according to JIS-K0064 of 55° to 110° C. and a solidification point according to JIS-K0064 which is at least 5° C. lower than the melting point, resin particles having a size of 0.05 to 2.0 microns and a coloring matter.

The resin and the resin particles are the same as each other or different from each other in the way of material. It is preferable that the resin particles are formed from a resin having a melting point according to JIS-K0064 of 55° to 110° C. and a solidification point according to JIS-K0064 which is at least 5° C. lower than the melting point.

It is preferable that the composition comprises 20 wt.% or more, based on the resin, of the resin particles and 20 to 80 wt.% of the resin as the solid content based on the entire composition.

The resin and the resin particles may be selected from a polyamide, a styrene resin, a polyester, polyethylene, a polyether, a copolymer of styrene and acrylic acid and a phenolic resin. The composition may further comprise a wax, a substance having a low molecular weight or another resin.

The invention present also provides a thermal transfer recording ink film which comprises a substrate and the composition as defined above, coated on the substrate.

The thermal transfer printing system comprises melting a hot-melt ink applied on a base film such as polyethylene terephthalate (PET) film by heating the ink from the back side of the base film with a thermal head to sufficiently infiltrate the ink into a paper for transfer or adhere the ink to the paper, and subsequently mechanically peeling off the base film from the paper to transfer the ink from the base film to the paper. Conventional ink ribbons are disposable ribbons which can be used only once because all of the molten ink is transferred to the paper owing to the cooling and solidification during the peeling. By contrast, in the case of a ribbon comprised of the ink film of the present invention, the ink maintains a molten state even when the film is peeled from the paper by virtue of the difference between the melting point and solidification point thereof. As a result, the molten ink mass is divided into two portions in the middle thereof so that not all, but only a part of the molten ink is transferred to the paper, whereby repeated printing can be achieved. Particularly, the presence of fine particles constituting at least part of the above-mentioned resin promotes the division of the ink mass in the middle thereof to improve the repeated printing performance of the ink because the particles act as an agent for inducing the division of the ink mass.

Any resin can be used in the present invention as long as it has a melting point (according to JIS-K0064) falling within a temperature range which can be attained with a common thermal transfer printer head, namely 55° to 110° C., and a solidification point (JIS-K0064) being at least 5° C. lower than the melting point. Examples of such resins include polyamide, polystyrene, polyester, polyethylene, polyether, styrene-acrylic copolymer, and phenolic resins. These resins may be partially crosslinked with a crosslinking agent, provided that the resultant crosslinked resins have a difference of at least 5° C. between the melting point and solidification point. The amount of such a resin to be blended in the ink is preferably 20 to 80 wt.% (based on the solid content).

The ink of the present invention may not only comprise the above-mentioned resin but may further comprise a common wax, a low-molecular substance, or a resin falling outside the above-mentioned category The ink composition comprising the above referred to additive is preferred to have a solidification point at least 5° C. lower than the melting point or softening point.

The method for determining a melting point and a solidification point of a resin according to JIS-K0064, is called the transparent method. This method has not been successfully applied to an ink composition. The melting point and the solidification point of an ink composition is determined by a measurement of the changes of viscoelasticity with temperature. In the present invention, a device using a rigid pendulum, DDV-OPA (tradename) being available from Orientech Co., Ltd., is used to determine the viscoelasticity. A melting point of a solidification point is determined at the maximum change of a delta value or a change cycle while a sample to be tested is being heated or cooled at a rate of 1° to 5° C. per minutes.

The ink of the present invention is preferably used in the form of a solvent-based ink at the time of application because at least part of the above-mentioned resin can be present in the form of fine particles having a size of 2.0 to 0.05μ in the final ink coating. In the case of a solvent-based ink, a solvent having a low capability of dissolving therein a resin to be used in used in combination with the resin to prepare an ink containing the resin, at least part of which is dispersed in the form of fine particles in the solvent, and the ink must be applied and dried to effect solidification thereof while keeping the fine particles therein. It is preferred that 20 wt.% or more of resin particles having a size of 2.0 to 0.05μ be present in the resin having a melting point of 55° to 110° C. and the solidification point is at least 5° C. lower than the melting point.

A wide variety of known dyes and pigments of yellow, red, blue, black and the like colors can be used as the coloring agent in the present invention without any particular limitation. For example, usable black pigments include carbon black and oil black.

A support to be used in the thermal transfer recording ink film of the present invention is desired to have high high-temperature strength, dimensional stability and surface smoothness. Specific preferred examples of the support include resin films having a thickness of 2 to 20μ and which are made of polyethylene terephthalate which has been mainly used as the material of base films of conventional thermal transfer recording ink films. Polycarbonate, polyethylene, polystyrene, polypropylene, or polyimide are also suitable.

When a printing test was made using a ribbon comprised of an ink film formed using an ink satisfying the requisites specified in the present invention to repeat black solid printing 5 times using the same ribbon, the optical density (measured with a Macbeth illuminometer) was 1.0 or higher until the third printing and as high as 0.8 even in the fifth printing, thus proving that the ink has a high performance as an ink for repeated printing.

DETAILED DESCRIPTION OF THE INVENTION

The following Examples will now illustrate the present invention in more detail, but they should not be construed as limiting the scope of the invention. EXAMPLE 1

An ink having the following composition was prepared using a polyester resin having a melting point of 72° C., a solidification point of 64° C., being 8° C. different from each other, and a melt viscosity at 120° C. of 180 cps in a mixed solvent system having a low capability of dissolving therein the polyester resin and composed of ligroins, isopropanol and toluene at a ratio of 2:2:1:

| | |
|---|---|
| polyester resin | 55% |
| ethylene/vinyl acetate resin | 12% |
| carnauba wax | 9% |
| dispersant | 4% |
| carbon black | 20% |

The ink was applied on a 6 μ-thick PET film to form a dry coating of 8 g/m$^2$. A cross-sectional photograph of the resulting ink sheet was taken to confirm the presence of polyester resin particles having a maximum size of 1 to 2μ together with carbon black particles, thus proving that the polyester resin which had been present in the form of particles in the solvent having a low solvency was present in the ink coating while keeping the above-mentioned form.

The ink sheet was used to evaluate the printing performance thereof with a commercially available thermal transfer printer (personal word processer Model Bungo Mini 7E manufactured by NEC). The evaluation was made by continuous black solid printing. The same portion of the ribbon was used a plurality of times to examine the variation of the optical density (measured with a Macbeth illuminometer) of a print with the number of runs of printing. The results are shown in FIG. 1.

Figure 1:
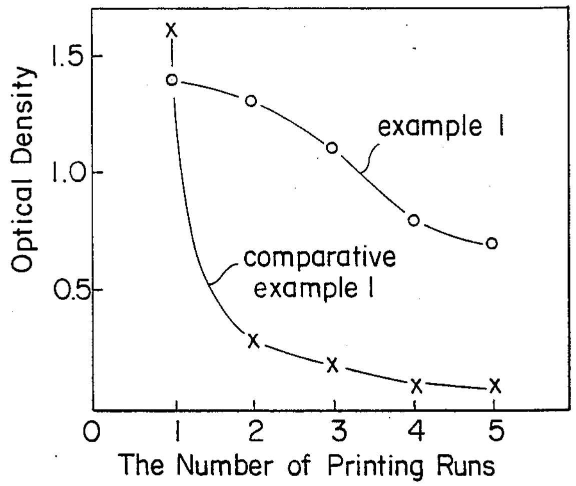
FIG. 1 is a graphical representation showing the variations of the optical densities of prints with the number of runs of printing using the ink ribbons obtained in Example 1 and Comparative Example 1.

As is apparent from FIG. 1, optical densities exceeding 1.0 were secured till the third printing, thus proving that the ink has a high performance as an ink for repeated printing.

Comparative Example 1

An ink having substantially the same composition as that of Example 1 except for inclusion of Wax HNP-10 (melting point: 75° C., solidification point: 75° C.), manufactured by Nippon Seiro Co., Ltd. instead of the polyester resin was prepared and examined with respect to the printing performance thereof in the same manner as that of Example 1.

The results are shown in FIG. 1. Substantially the whole of the ink was transferred in the first printing, with the result that repeated use of the ribbon was impossible.

Comparative Example 2

An ink having substantially the same composition as that of Example 1 except for use of a polyester resin having a melting point of 72° C., a solidification point of 64° C., being 8° C. different from each other, and a melt viscosity at 120° C. of 180cps and toluene as the solvent was prepared and examined with respect to the printing performance thereof in the same manner as that of Example 1.

Figure 2:
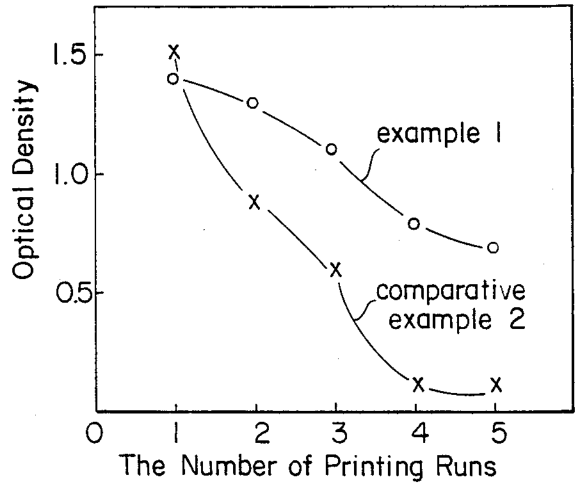
FIG. 2 is a graphical representation showing the variations of the optical densities of prints with the number of runs of printing using the ink ribbons obtained in Example 1 and Comparative Example 2.

FIG. 2 shows the results, from which it can be understood that a decrease in the optical density of the print occurred rapidly as compared with that in Example 1, thus proving that the ink has a poor performance as an ink for repeated printing. As a result, it became apparent that the performance of an ink for repeated printing can be markedly improved by allowing fine particles of a resin to remain in the ink as shown in Example 1.

EXAMPLE 2

An ink having the following composition was prepared using a polyester resin having a melting point of 72° C., a freezing point of 64° C. (difference between the melting point and the freezing point: 8° C.) and a melt viscosity at 120° C. of 180 cps, and a polyethylene resin having a melting point of 78° C., a solidification point of 72° C., being 6° C. different from each other, and a melt viscosity at 120° C. of 3,300 cps in a mixed solvent system having a low capability of dissolving therein the polyester resin and composed of ligroin, isopropanol and toluene at a ratio of 2:2:1:

| | |
|---|---|
| polyester resin | 35% |
| polyethylene resin | 20% |
| ethylene/vinyl acetate resin | 12% |
| carnauba wax | 9% |
| dispersant | 4% |
| carbon black | 20% |

The ink was applied on a 6 μ-thick PET film to form a dry coating of 8 g/m². A cross-sectional photograph of the resulting ink sheet was taken to confirm the presence of polyester resin particles having a maximum size of 1 to 2μ together with carbon black particles, thus proving that the polyester resin which had been present in the form of particles in the solvent having a low solvency was present in the ink coating while keeping the above-mentioned form.

The ink sheet was used to evaluate the printing performance thereof in the same manner as that of Example 1. The results are shown in FIG. 3.

Figure 3:
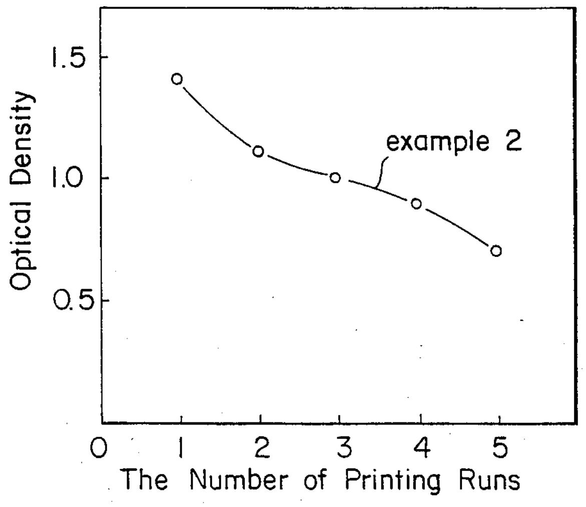
FIG. 3 is a graphic representation showing the variation of the optical density of a print with the number of runs of printing using the ink ribbon obtained in Example 2.

As is apparent from FIG. 3, optical densities of at least 1.0 were secured till the third printing, thus proving that the ink has a high performance as an ink for repeated printing.

We claim:

1. A thermal transfer recording ink composition which comprises 20 to 80 wt.% of a resin as the solid content based on the entire composition having a melting point of 55° to 110° C. and a solidification point which is at least 5° C. lower than the melting point, 20% or more, based on the resin, of resin particles formed from a resin having a melting point of 55° to 110° C. and a solidification point which is at least 5° C. lower than the melting point and having a size of 0.05 to 2.0 microns and a coloring matter.

2. The composition as claimed in claim 1, in which the resin and the resin particles comprise the same material.

3. The composition as claimed in claim 1, in which the resin and the resin particles comprise different material.

4. The composition as claimed in claim 1, in which said resin and said resin particles are selected from the group consisting of a polyamide, a polystyrene, a polyester, polyethylene, a polyether, a copolymer of styrene and acrylic acid and a phenolic resin.

5. The composition as claimed in claim 1, which further comprises a wax.

6. A thermal transfer recording ink film which comprises a substrate and the composition as defined in claim 1, coated on the substrate.

7. The composition as claimed in claim 1, in which the coloring matter is a dye or a pigment.

8. The composition as claimed in claim 1, in which the coloring matter is carbon black or oil black.

9. The film as claimed in claim 6, in which said substrate is a resin film having a thickness of 2 to 20μ.

10. The film as claimed in claim 6, in which said substrate is polyethylene terephthalate, polycarbonate, polyethylene, polystyrene, polypropylene or polyimide.

* * * * *